May 1, 1923.
G. F. ROYER
AIR HOSE STAND
Filed June 14, 1920
1,453,999
2 Sheets-Sheet 1
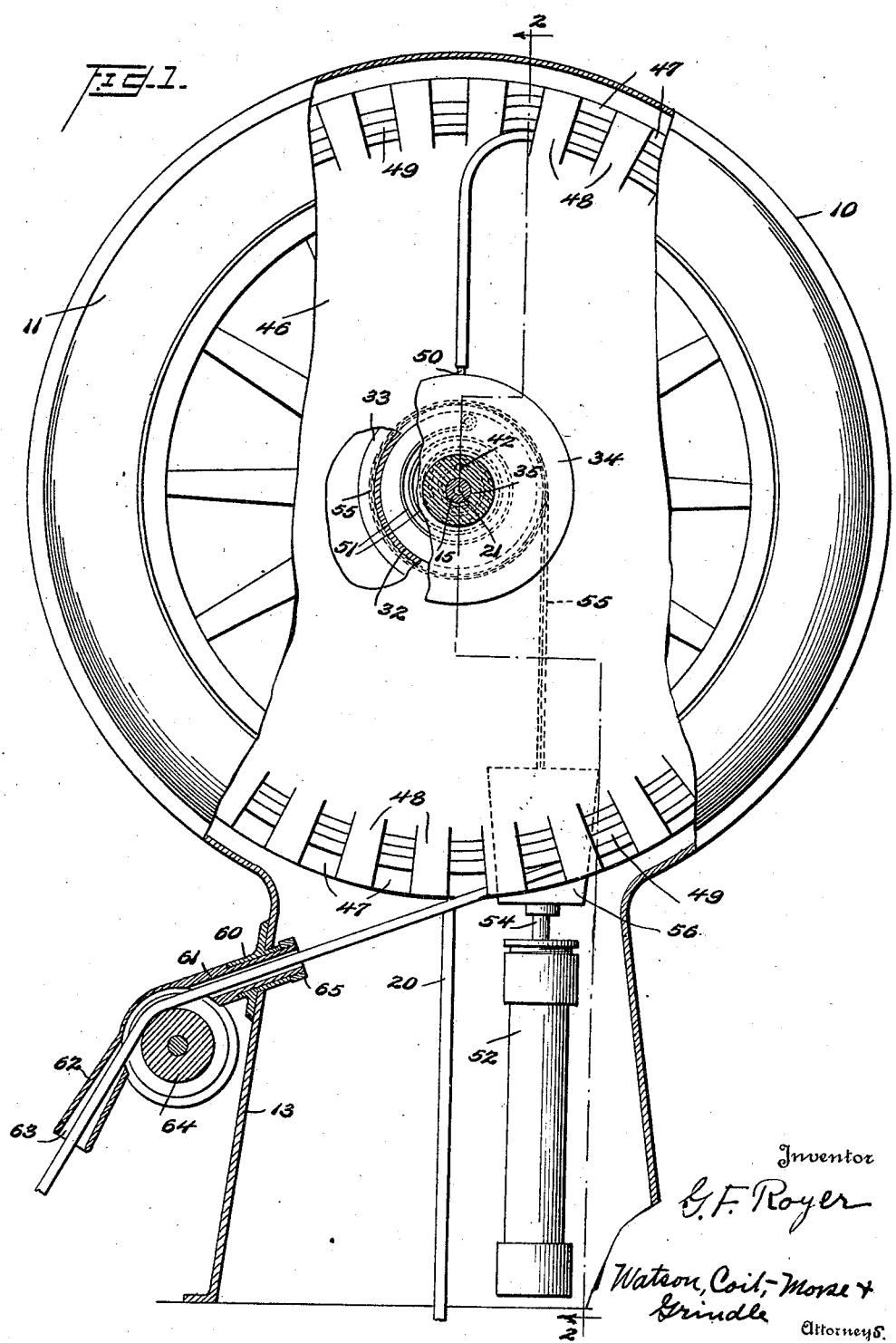
Inventor
G. F. Royer
Watson, Coit, Morse &
Grindle
Attorneys.

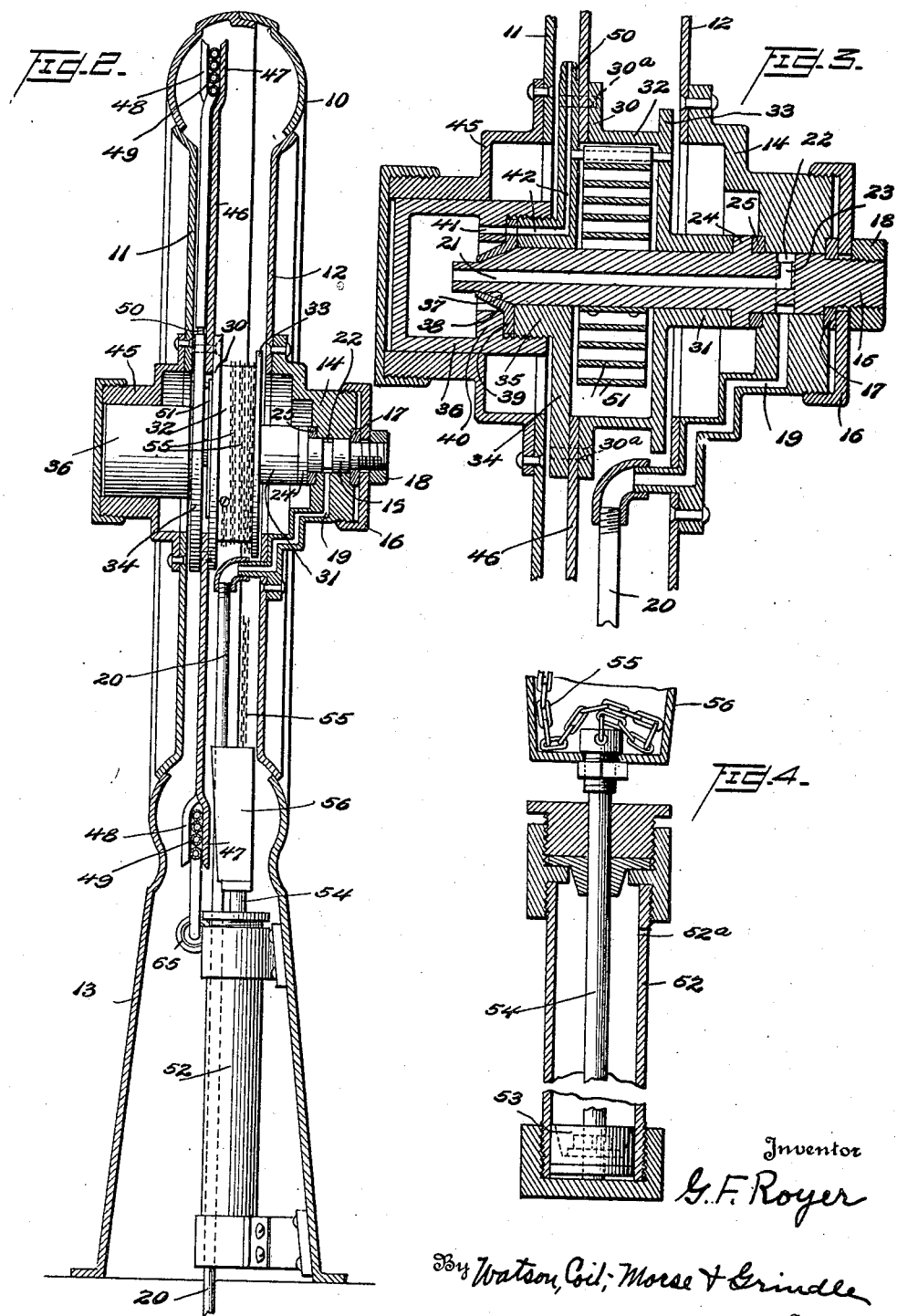

Patented May 1, 1923.

1,453,999

UNITED STATES PATENT OFFICE.

GEORGE F. ROYER, OF WILKES-BARRE, PENNSYLVANIA.

AIR-HOSE STAND.

Application filed June 14, 1920. Serial No. 388,928.

*To all whom it may concern:*

Be it known that I, GEORGE F. ROYER, a citizen of the United States, and resident of Wilkes-Barre, in the county of Luzerne and State of Pennsylvania, have invented certain new and useful Improvements in Air-Hose Stands, of which the following is a specification.

This invention relates to air hose stands and particularly to devices of that kind in which an air hose is mounted upon a reel supported in the stand so that the hose can be unwound from the reel for the purpose of inflating a tire or for any other use and which will be automatically rewound thereon when not in use.

It is the object of the invention to provide a device of the kind referred to which shall be simple in construction and effective in operation and which is provided with means for gradually stopping the rotation of the reel as the hose is rewound thereon so that the parts of the device will not be injured by the jar resulting from sudden stopping of the reel. A further object is to provide an improved guide for the hose so that the same may be withdrawn from the reel in any direction desired and undue friction and wear on the hose avoided.

The invention is set forth in the following specification and one embodiment of the same is illustrated in the accompanying drawings, in which—

Figure 1 is a side elevation of a stand having the invention applied thereto, the lower part of this figure showing certain features of the improved construction in section and the upper part showing the casing broken away to illustrate certain parts of the mechanism;

Figure 2 is a transverse sectional view on the line 2—2 of Fig. 1, certain parts appearing in elevation;

Figure 3 is also a transverse sectional view on the line 2—2 of Fig. 1, certain parts being shown broken off, and Figure 4 is an enlarged sectional view of certain parts of the mechanism shown on the lower part of Fig. 2.

Referring to the drawings in detail the numeral 10 generally represents a casing in which the parts of the mechanism are enclosed. This casing comprises upper portions 11 and 12 which may be formed from sheet metal and shaped to any desired contour as for example so as to represent an automobile wheel with a tire mounted thereon as set forth in my Design Patent No. 57,271, granted Mar. 8, 1921, covering the design of the stand. The lower part of the casing is shaped to form a base 13 upon which the various parts of the construction are supported.

To the portion 12 of the casing there is secured a hub member 14 in which a shaft 15 is rigidly mounted. A nut 16 surrounds the end of this shaft and is threaded upon the hub member 14 a gasket 17 being arranged between said nut and the hub member 14. The end of the shaft 15 is threaded and a locking nut 18 is mounted thereon which serves the purpose of securely holding the parts 14, 15 and 16 together. The hub member 14 is provided with a passage 19 for compressed air, the air being supplied from any suitable source (not shown) through a pipe 20 to said passage 19.

The shaft 15 is provided with a longitudinally extending passage 21 and the portion of said shaft mounted in the hub member 14 is provided with a circumferential groove 22 which is positioned to communicate with the passage 19 in said hub member. The groove 22 is connected to the passage 21 by means of a short passage 23 in the shaft 15. The shaft 15 is also provided with an annular shoulder 24 between which and the inner portion of the hub member 14 there is arranged a gasket 25, this gasket together with the gasket 17 heretofore referred to constituting means for preventing the escape of compressed air from the circumferential groove 22 of said shaft.

Rotatably mounted on the shaft 15 is a bearing which is made up of two members 30 and 34 secured together in any suitable manner as by means of screws 30ª. The member 30 of the bearing includes a portion 31 which surrounds and contacts with said shaft 15 and a second portion 32 which is spaced from said shaft and so arranged as to form a cylindrical drum for a purpose hereinafter pointed out. A part of the member 30 of the bearing is arranged to form a flange 33 on the exterior of said drum. The other member 34 of said bearing is provided with a portion 35 which surrounds and closely fits the shaft 15. A recessed nut 36 surrounds the portion 35 of the bearing and is threaded thereon. The end of the shaft 15 lies within the recess of said recessed nut 36 so that compressed air from the passage 21 will enter the recess of said nut. The end of the shaft 15 is provided with a beveled portion 37 on which a cone-shaped gasket 38 is mounted, said gasket having a base portion 39 which is clamped between a shoulder 40 on said recessed nut and the part 35 of the bearing. The shouldered portion 40 of the recessed nut is provided with a passage 41 which communicates with a passage 42 formed in the parts 34 and 35 of the bearing, the gasket 37 also being provided with a suitable passage which communicates with the passages 41 and 42 above referred to.

Surrounding the recessed nut 36 is a second hub member 45 which is rigidly secured to the part 11 of the casing. The recessed nut 36 is preferably arranged to closely fit within the hub member 45 so that additional bearing surface will be provided for the rotating parts of the device.

A reel 46 is rigidly secured between the parts 30 and 34 of the bearing member, said reel on its periphery being provided with arms 47, 48 between which an air hose 49 is adapted to be received. At the outer end of the passage 42 in the part 34 of the bearing, there is provided a nipple 50 to which the end of the air hose 49 may be attached.

Within the drum portion 32 of the bearing there is arranged a coiled spring 51 which surrounds the shaft 15, one end of this coiled spring being secured to the shaft in any suitable manner and the other end being secured to the bearing. This spring is so arranged that when the reel is rotated by unwinding the hose therefrom the spring will be put under tension with the result that when the hose is released the spring will rotate the reel and rewind the hose thereon.

In order to avoid injury to various parts of the mechanism by sudden stopping of the rotation of the reel when the same is rotated by the spring 51 the following mechanism is provided. Mounted in the lower portion of the stand and rigidly secured to the base 13 is a cylinder 52 within which there is arranged a piston 53. A rod 54 is connected to said piston and projects through a suitable air tight wall or packing in the upper portion of the cylinder. A chain 55 is secured at one end to the rod 54 and at its other end to the exterior of the cylindrical drum 32 heretofore referred to. A cup 56 is also secured to the rod 54 and surrounds the chain 55 for a purpose which will later appear. The chain is so arranged on the drum 32 that as the drum is rotated under the influence of the spring 51 the chain will be wound upon the drum and the chain is of such a length that it will be completely wound upon the drum before the hose is entirely withdrawn into the casing of the stand. The result is that before rotation of the reel ceases the piston 53 will be drawn upwardly in the cylinder 52 which action will tend to compress the air in the cylinder and thus cause a gradual stopping of the rotation of the drum and reel. When the reel is rotated by withdrawing the hose from the casing the chain 55 will be unwound from the drum 32 and will be deposited in the cup 56 heretofore described and on account of the weight of the chain and of the other parts associated therewith the piston 53 will be gradually forced toward the lower end of the cylinder 52 the cylinder being provided at its upper portion with an air vent 52$^a$ which permits the entrance of the air to the cylinder as the piston 53 descends, but is sufficiently small to prevent rapid escape of the air as the piston is raised in the cylinder as heretofore described.

In order to prevent excessive wear of the hose and to facilitate withdrawal of the same from the reel in any desired direction and the rewinding of the same upon the reel the following mechanism is provided. The lower part of the casing is provided with a hollow bearing member 60 rigidly secured thereto within which a tubular guide is rotatably mounted. The tubular guide comprises an inner portion 61 which is rotatably arranged in the bearing 60 and an outer portion 62 having a flaring opening 63. The portion 61 of the tubular guide is provided on its inner end with threads on which a nut 65 is mounted so as to secure the guide in the bearing member 60. Between the parts 61 and 62 of the guide there is mounted a wheel 64 the periphery of which is grooved so that as the hose passes through the tubular guide it will contact with the wheel and pass through the peripheral groove formed therein. It will be noted that the inner portion 61 of the tubular guide is inclined downwardly which serves to prevent rain or dirt from entering the casing, and such inner portion 61 is also arranged so as to be substantially tangent to the hose wound on the reel 46.

The operation of the various parts of the device has been stated to some extent in describing the same and a brief description of the operation of the mechanism as a whole will suffice. Assuming that the parts are in the position shown in Fig. 2 of the drawing with the hose 49 wound upon the reel 46, it will be understood that the end of the hose is adjacent the tubular guide member mounted in the lower portion of the stand. When the hose is grasped for the purpose of withdrawing the same from the stand the guide member 61, 62 will rotate in its bearing so as to permit easy withdrawal of the hose in the direction desired. As the hose is withdrawn from the stand the reel 46 will be caused to rotate, which results in putting the spring 51 under tension. As the hose is withdrawn the chain 55 will be unwound from the drum 32 and deposited in the cup 56 and the piston 53 will be caused to move to the lower end of the cylinder 52. When the hose is released the spring 51 being under tension will rotate the reel 46 in the opposite direction causing the hose to be rewound upon the reel. Before the hose is completely rewound the chain 55 will be wound upon the drum 32 and further movement of the reel and drum under the influence of the spring 51 will cause the piston 53 to rise in the cylinder 52 and as the air in the cylinder above the piston is gradually compressed the rotation of the reel will be gradually stopped. The various passages formed in the different parts of the device are so arranged that at all times compressed air is free to flow through the same to the hose 49.

Having thus described my invention what I claim as new and desire to secure by Letters Patent is:

1. In a construction of the kind described, a reel adapted to support an air conveying hose wound thereon, a bearing to which said reel is secured, a fixed shaft on which said bearing is rotatably mounted, said bearing including a drum portion spaced from said shaft to form a spring receiving recess, a coiled spring arranged in said recess around said shaft, and having one end secured to said bearing and the other to said shaft, and means for conducting compressed air through said shaft and bearing to said hose.

2. In a construction of the kind described, a reel adapted to support an air conveying hose wound thereon, a bearing to which said reel is secured, a fixed shaft on which said bearing is rotatably mounted, said bearing including a cylindrical portion spaced from said shaft to form a spring-receiving recess, a coiled spring mounted in said recess around said shaft and having its ends connected respectively to said bearing and shaft whereby the same is put under tension as the hose is unwound from said reel, the said spring operating to rewind the hose on the reel, means for gradually and increasingly retarding the rotation of the reel during the latter part of the rewinding thus gradually stopping it, and means for conducting compressed air through said shaft and bearing to the hose on the reel.

3. In a construction of the kind described, a reel adapted to support an air conveying hose wound thereon, means for rotatably supporting said reel, means for automatically rotating said reel to rewind the hose thereon after the same has been unwound therefrom, means for gradually decreasing the speed of rotation of said reel during the latter part of the rewinding and gradually stopping it when the hose is rewound thereon, and means for conducting compressed air to the hose on the reel.

4. In a construction of the kind described, a reel adapted to support an air conveying hose wound thereon, means for rotatably supporting said reel, means for conducting compressed air to the hose on the reel, means for automatically rotating said reel to rewind the hose thereon after the same has been unwound therefrom, and pneumatic means operated by the rotation of said reel for gradually stopping the rotation thereof as the hose reaches the end of its predetermined rewinding movement and means whereby said pneumatic means is caused to operate during the final portion only of the rewinding movement of the reel.

5. In a construction of the kind described, a reel adapted to support an air conveying hose wound thereon, means for rotatably supporting said reel, means for conducting compressed air to the hose on the reel, means for automatically rotating said reel to rewind the hose thereon after the same has been unwound therefrom, a cylinder, a piston therein, connecting means between said piston and said reel for causing said piston to move in said cylinder when said reel is being rotated by said automatic means whereby rotation of said reel is gradually stopped as the hose reaches the end of its predetermined rewinding movement, said connecting means being arranged to cause movement of said piston in said cylinder during the final portion only of the rewinding movement of the reel.

6. In a construction of the kind described, a reel adapted to support an air conveying hose wound thereon, a bearing to which said reel is secured, a fixed shaft on which said bearing is rotatably mounted, means for conducting compressed air through said shaft and bearing to the hose on the reel, said bearing including a drum spaced from said shaft to form a spring receiving recess, a coiled spring mounted therein and having its ends secured respectively to said shaft and said bearing, said spring arranged to be put under tension as the hose is unwound from said reel and serving to automatically rotate the drum and reel to rewind the hose on the reel, a cylinder, a piston therein, flexible means attached to said drum and to said piston and arranged to be wound upon said drum as the same is rotated by said spring, whereby rotation of said reel is gradually stopped as the hose is rewound thereon.

7. In a construction of the kind described, a reel adapted to support an air conveying hose wound thereon, a bearing to which said reel is secured, a fixed shaft on which said bearing is rotatably mounted, means for conducting compressed air through said shaft and bearing to the hose on the reel, said bearing including a drum spaced from said shaft to form a spring receiving recess, a coiled spring mounted therein and having its ends secured respectively to said shaft and said bearing, said spring arranged to be put under tension as the hose is unwound from said reel and serving to automatically rotate the drum and reel to rewind the hose on the reel, a cylinder, a piston therein having a rod attached thereto, a cup secured to said rod, a chain attached to said drum and to said rod inside said cup, said chain being arranged to be unwound from said drum and received in said cup as the hose is withdrawn from said reel and to be wound thereon when said drum is rotated by said spring, whereby said piston is moved in said cylinder and rotation of said reel is gradually stopped as the hose is rewound thereon.

8. In a construction of the kind described, a casing, a reel rotatably mounted therein and adapted to support an air conveying hose wound thereon, means for supplying compressed air to said hose, means for automatically winding the hose on the reel after it has been withdrawn therefrom, a guide for said hose comprising a tubular member through which said hose is adapted to pass, said guide comprising an inner part rotatably secured in said casing and an outer part arranged at an angle to the inner part, and a wheel positioned between said parts and having a grooved periphery positioned to contact with the hose as it passes through the guide.

9. In a construction of the kind described, a casing, a reel rotatably mounted therein, and adapted to support an air conveying hose wound thereon, a guide in said casing through which the hose is adapted to pass as it is wound or unwound from said reel, said guide comprising an inner tubular part rotatably secured in said casing and an outer tubular part at an angle to the inner part having a flaring opening, a wheel arranged between the parts of said guide and having a grooved periphery positioned to contact with the hose as it passes through the guide.

10. In a construction of the kind described, a casing, a hub member secured thereto, and provided with a passage for compressed air, a shaft rigidly secured in said member, said shaft having a passage therethrough communicating with the passage in said hub member, a bearing rotatably mounted on said shaft to form a spring receiving recess, a coiled spring in said recess having its ends secured respectively to said shaft and said bearing, a second hub member secured to said casing on the side opposite said first named hub member, a recessed nut arranged in said second hub member around the end of said shaft and threaded upon a part of said bearing, the recess of said nut being in open communication with the passage in said shaft, said nut and bearing being provided with a passage communicating with said recess of the nut, a reel secured to said bearing and adapted to support a hose and means for attaching the end of the hose at the outlet of said last named passage.

11. In a construction of the kind described, a casing, a hub member secured thereto, and provided with a passage for compressed air, a shaft rigidly secured to said member, said shaft having a passage extending longitudinally therein and communicating with the passage in said member, the end of said shaft opposite said hub member being tapered, a conical gasket mounted on the tapered portion of said shaft, a bearing rotatably supported on said shaft, a recessed nut surrounding the end of said shaft and secured to said bearing, a part of said gasket being arranged between said bearing and said nut, a second hub member secured to said casing and forming a bearing for said recessed nut, said nut, gasket and bearing having a passage for compressed air.

12. In a device of the class described the combination with an enclosed base portion of an enclosed reel casing mounted centrally above and on said base, a rotatable reel centrally mounted in said reel casing adapted to carry a hose wound thereon spirally, a fixed shaft carried by said reel casing for said reel, means for turning said reel to rewind the hose thereon, means for supplying fluid to said hose, and a guide for said hose extending through the wall of said base below said reel on a line substantially tangent to the periphery of the wound hose on said reel at its lower part, said guide comprising a tubular member having an inner portion rotatably supported in the wall of said base and extending outwardly and downwardly and also having a outer portion arranged at an angle to said inner portion.

13. In a device of the class described the combination with an enclosed base portion of an enclosed reel casing mounted centrally above and on said base, a rotatable reel centrally mounted in said reel casing adapted to carry a hose wound thereon spirally, a fixed shaft carried by said reel casing for said reel, means for turning said reel to rewind the hose thereon, means for supplying fluid to said hose, and a guide for said hose extending through and beyond the wall of said base below said reel, said guide comprising an inner portion rotatably supported in the wall of the base and an outer portion arranged at an angle to said inner portion, the inner portion of said guide being inclined downwardly and being arranged on a line substantially tangent to the periphery of the wound hose on said reel at its lower part.

14. In a device of the class described the combination with a reel adapted to support a hose wound thereon, of yielding means for automatically rotating said reel to rewind the hose thereon when it has been unwound, and means connected to said reel and so constructed as to interpose no resistance to the rotation of the reel in rewinding during the first and major portion of the rewinding action and to then interpose a predetermined gradually increasing resistance to further rewinding rotation until the rotation ceases.

15. In a device of the class described the combination with an enclosed base portion of an enclosed reel casing mounted centrally above and on said base having spaced side walls which are substantially parallel at their central portions, a rotatable reel in said reel casing adapted to carry a hose wound thereon one turn over the other, operating and supporting means extending across said casing and connected to and carried by said side walls at their central portions, embodying a part rotatively supporting said reel, automatic yielding means concentric therewith between said walls for turning said reel in one direction to wind the hose thereon and means for carrying fluid under pressure to said hose through said operating and supporting means and means having parts extending downwardly from said operating means into said base for automatically interposing gradually increasing resistance to the rotation of said reel in rewinding at a predetermined point in the latter part of the rewinding to gradually stop the rewinding.

16. In a device of the class described the combination with an enclosed base portion of an enclosed reel casing mounted centrally above and on said base having spaced side walls which are substantially parallel at their central portions, a rotatable reel in said reel casing adapted to carry a hose wound thereon one turn over the other, two hub members secured to the outer faces of said walls at their central portions opposite each other, operating and supporting means extending across said casing carried by said hub members and embodying a fixed part rotataively supporting said reel, automatic yielding means concentric therewith between said walls for turning said reel in one direction to wind the hose thereon and means for carrying fluid under pressure to said hose through said operating and supporting means.

17. In a device of the class described the combination with an enclosed base portion of an enclosed reel casing mounted centrally above and on said base having spaced side walls which are substantially parallel at their central portions, a rotatable reel in said reel casing adapted to carry a hose wound thereon one turn over the other, two hub portions secured to the outer faces of said walls at their central portions opposite each other, operating and supporting means extending across said casing carried by said hub members and embodying a fixed shaft rigidly secured to one hub portion and extending into the other, a bearing including a drum rotatively mounted on said shaft between said hub portions having said reel secured thereto to rotate therewith, a coiled spring in said drum so connected thereto and to said shaft as to automatically cause the rotation of said drum and reel in one direction, and means for conveying fluid under pressure through said hubs, shaft and drum to said hose.

18. In a device of the class described, the combination with an enclosed base portion of an enclosed reel casing mounted centrally above and on said base portion and having spaced side walls which are substantially parallel at their central portions, a rotatable reel in said reel casing adapted to carry a hose wound thereon, two hub members secured to the outer faces of said walls at their central portions opposite each other, a shaft rigidly secured in one of said hub members and extending into the other hub member, said reel being rotatably mounted on said shaft, said shaft being provided with a longitudinal passage and one of said hub members being provided with a passage communicating with the passage in said shaft, a nut secured to said reel and rotatably mounted in the other of said hub members, said nut having a recess communicating with the passage in said shaft, said reel being provided with a passage communicating with the recess in said nut whereby air is conveyed from said recess to the hose carried by said reel, a coiled spring surrounding said shaft and secured thereto at one end, the opposite end of said spring being secured to said reel.

In testimony whereof I affix my signature.

GEORGE F. ROYER.